US010704510B2

(12) United States Patent
Wolf et al.

(10) Patent No.: US 10,704,510 B2
(45) Date of Patent: Jul. 7, 2020

(54) HANDHELD WORK APPARATUS

(71) Applicant: Andreas Stihl AG & Co. KG, Waiblingen (DE)

(72) Inventors: Guenter Wolf, Oppenweiler (DE); Ulrich Kapinsky, Waiblingen (DE); Matthias Maier, Waiblingen (DE); Robert Koehli, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 54 days.

(21) Appl. No.: 16/131,974

(22) Filed: Sep. 14, 2018

(65) Prior Publication Data
US 2019/0085797 A1    Mar. 21, 2019

(30) Foreign Application Priority Data

Sep. 15, 2017    (EP) .................................. 17400054

(51) Int. Cl.
| | |
|---|---|
| *F02M 35/02* | (2006.01) |
| *B27B 17/00* | (2006.01) |
| *B01D 46/00* | (2006.01) |
| *B25F 5/02* | (2006.01) |
| *F02B 63/02* | (2006.01) |
| *F02M 35/024* | (2006.01) |

(Continued)

(52) U.S. Cl.
CPC ..... *F02M 35/0205* (2013.01); *B01D 46/0005* (2013.01); *B25F 5/02* (2013.01); *B27B 17/00* (2013.01); *F02B 63/02* (2013.01); *F02M 35/02416* (2013.01); *F02M 35/02483* (2013.01); *B01D 2277/20* (2013.01); *B01D 2279/60* (2013.01); *B27B 17/02* (2013.01); *B27B 17/08* (2013.01)

(58) Field of Classification Search
CPC ... B01D 46/0005; F02M 35/0205; B25F 5/02; F02B 63/02
See application file for complete search history.

(56) References Cited

U.S. PATENT DOCUMENTS 2,920,717 A * 1/1960 Fenton ................. F02M 35/024
55/418
3,881,250 A * 5/1975 Frederickson .......... B27B 17/00
30/383

(Continued)

FOREIGN PATENT DOCUMENTS

JP           H0326501 U      3/1991

*Primary Examiner* — Kevin A Lathers
(74) *Attorney, Agent, or Firm* — Walter Ottesen, P.A.

(57) ABSTRACT

A handheld work apparatus has a combustion engine for driving a tool of the work apparatus and further has an air filter unit for filtering the intake air of the combustion engine. The work apparatus defines a vertical direction. The air filter unit includes an air filter and a filter housing enclosing the air filter. The air filter extends along a filter axis and has a filter element disposed peripherally around the filter axis, wherein the filter axis forms an angle of inclination ($\alpha$) with the vertical direction. The filter element has an upper filter section in relation to the vertical direction. The filter housing has, remotely from the upper filter section, at least one air intake window and, in addition thereto, a further upper, permanently open cold air intake window in the region of the upper filter section.

20 Claims, 4 Drawing Sheets

(51) Int. Cl.
*B27B 17/02* (2006.01)
*B27B 17/08* (2006.01)

(56) References Cited

U.S. PATENT DOCUMENTS

| | | | | |
|---|---|---|---|---|
| 4,594,083 A | * | 6/1986 | Hiraizumi | F02B 63/02 |
| | | | | 30/381 |
| 4,783,207 A | * | 11/1988 | Nagashima | B27B 17/00 |
| | | | | 123/198 E |
| 4,936,271 A | | 6/1990 | Nagashima et al. | |
| 5,062,875 A | * | 11/1991 | Nagashima | B27B 17/00 |
| | | | | 55/493 |
| 8,591,618 B2 | * | 11/2013 | Shirai | F02M 35/024 |
| | | | | 123/198 E |
| 2013/0306018 A1 | * | 11/2013 | von Krane | F02M 35/10144 |
| | | | | 123/184.21 |
| 2017/0165863 A1 | | 6/2017 | Wolf et al. | |
| 2017/0306900 A1 | * | 10/2017 | Doring | F02M 35/024 |

* cited by examiner

HANDHELD WORK APPARATUS

CROSS REFERENCE TO RELATED APPLICATION

This application claims priority of European patent application no. 17 400 054.7, filed Sep. 15, 2017, the entire content of which is incorporated herein by reference.

BACKGROUND OF THE INVENTION

In handheld work apparatuses of the kind in question, the intake air filter of the combustion engine has an inclined filter axis. This means that the filter element around the filter axis also has an upper filter section in relation to the vertical direction, in addition to a lower section and lateral sections. The air filter is enclosed by a filter housing, which has at least one air intake window. This at least one air intake window is situated remotely from the aforementioned upper filter section, that is, in the region of the lower or lateral filter sections. The flow of intake air entering the interior of the filter housing as a result is now distributed around the periphery of the filter element, in order to achieve the most uniform possible air throughput through the filter material ideally at all points. The material of the filter element in this case retains impurities in the intake air of the most varied kinds, ranging from fine dust to coarse shavings. Finer particles are caught in or on the filter material in the process, whereas coarse impurities such as wood shavings or the like are intended to fall from the filter element, where possible, in order not to impair the air throughput.

Under actual operating conditions, however, it has been found that the aforementioned coarse particles of impurities are prone to accumulate on the upper filter section, where they then remain without falling off. This can lead to the space between the upper filter section and the housing section located above it being filled completely. The resulting blockage prevents a surround-flow around the filter element and a through-flow of the filter material distributed uniformly over the periphery, which reduces the filtration performance and increases the intake resistance. In order to prevent any such blockage, the filter housing and also the air filter, if necessary, must be removed. A suchlike time-consuming maintenance intervention also harbours the risk of the coarse impurities, which then fall suddenly, reaching the clean-air side of the filter and, in so doing, entering the intake passage of the combustion engine.

SUMMARY OF THE INVENTION

It is an object to improve a work apparatus in such a way that reliable filtration of the intake air is possible in conjunction with a reduced maintenance effort.

This object can, for example, be achieved by a handheld work apparatus having: a tool; a combustion engine for driving the tool; an air filter unit for filtering intake air of the combustion engine; the work apparatus defining a vertical direction; the air filter unit including an air filter and a filter housing enclosing the air filter; the air filter extending along a filter axis and having a filter element disposed peripherally around the filter axis; the filter axis forming an angle of inclination ($\alpha$) with the vertical direction; the filter element having an upper filter section in relation to the vertical direction; the filter housing having, remotely from the upper filter section, at least one air intake window; and, the filter housing having, in addition to the at least one air intake window, a further upper, permanently open cold air intake window in a region of the upper filter section.

The disclosure is based initially on the finding that, on the one hand, the formation of an impurity deposit is favored by the upper filter section acting essentially as a deposit surface and that, on the other hand, certain flow conditions prevailing at that point also have an influence. Taking this inventive finding as the basis, it is now proposed that the filter housing has, in addition to the at least one air intake window, a further upper, permanently open cold air intake window in the region of the upper filter section. In particular, the flow through the filter element is radial to the filter axis. A total of at least two mutually separated windows are thus proposed, which, in addition to the preferred radial through-flow of the filter element, produce a controlled flow around the same in a particular manner in interaction with one another. A proportional surround-flow also takes place in the peripheral direction outside the filter element. The cold air entering from above through the permanently open cold air intake window is relatively clean with a comparatively low level of contamination. It is diverted laterally at the upper filter section and is guided downwards on the lateral sections of the filter element. The existing at least one air intake window is located further down. Air with a higher degree of contamination is admitted as a result of this. This proportional flow of intake air also experiences a diversion, in particular upwards on the lateral sections of the filter section. However, the entrained shavings and other particles of contamination are not able to reach the upper filter section, since the partial flow in the upward direction of the at least one air intake window encounters the partial flow in the downward direction of the upper, permanently open cold air intake window and, for that reason, is slowed down in the peripheral direction. In relation to the peripheral direction, this leads to the formation of a "bottleneck" or a "congestion front" in the region of the lateral sections of the filter element as a barrier to the further transport of shavings and contamination from bottom to top. In addition, any accumulations thereof that are possibly still present or are formed on the upper filter section are also, for their part, blown away in the peripheral direction to the lateral filter sections. In any event, the particles that are led to the lateral surfaces of the filter element are scarcely capable of being deposited there. If a temporary lateral deposit forms, however, this will fall during idling or with the engine switched off, and at the latest of its own accord under the effect of gravity when the work apparatus is next placed on the ground. The formation of a deposit of shavings or other coarse particles of impurities around the periphery of the filter, and in particular on the upper filter section, is reliably avoided. As a result of this, the filter element remains free from deposits and blockages around its entire periphery. The fresh air entering into the filter housing is capable of being distributed freely and of being sucked through the filter element around its entire periphery.

The configuration of the additional, upper intake window as a permanently open cold air intake window ensures, on the one hand, that the effect described above is permanently and reliably available, without the user being required to intervene actively and to take corrective action. Without the air being preheated by the combustion engine, the flow of intake air in its entirety remains cold, which benefits the performance development.

The air filter unit has a transverse axis defined by the vertical direction in a reference plane oriented perpendicularly to the filter axis. In a further embodiment, the upper, permanently open cold air intake window is situated on this upwardly directed axis and, in particular, is configured symmetrically in relation thereto. It may be appropriate to provide only a single air intake window remotely from the upper filter section. However, the filter housing preferably has a lateral air intake window, respectively on each of the mutually opposing sides of the upwardly directed axis. This produces a flow guide around the filter element inside the air filter housing, which continues from the upper filter section in both horizontal directions and carries away any particles of dirt that are present there in both horizontal directions, whereas the two lateral air intake windows ensure that no opportunities for deposits and blockages arise, including in the lateral regions.

The air filter unit defines a transverse axis oriented perpendicularly to the upwardly directed axis in the reference plane oriented perpendicularly to the filter axis. In a further embodiment, the at least one lateral air intake window is situated beneath this transverse axis. In conjunction with the positioning of the permanently open cold air intake window in the region of the upper filter section, a large vertical distance is produced between the two windows, which gives rise to pronounced velocity components of the air flow in the peripheral direction of the filter element. This contributes to an equalization of the air distribution around the filter element and in addition prevents the formation of deposits, including in the region between the windows.

In a preferred embodiment, the upper, permanently open cold air intake window extends in the reference plane through a first peripheral angle, wherein this first peripheral angle is ≤90° and preferably ≤70° and in particular is at least approximately 50°. The filter housing expediently has a peripheral wall, wherein the peripheral wall includes a lateral, flow-impervious wall section between the upper, permanently open cold air intake window and the neighboring lateral air intake window, which wall section extends in the reference plane through a second peripheral angle, wherein the second peripheral angle is >60° and in particular >80°. Advantageously, the upper, permanently open cold air intake window can have a center point in relation to its extent in the peripheral direction, wherein the center point of the upper, permanently open cold air intake window is positioned in the reference plane at a third peripheral angle relative to the adjoining edge of the neighboring air intake window, and wherein the third peripheral angle falls within a range from 100° to 130° inclusive and, in particular, amounts to at least approximately 120°. As a result of the aforementioned angle values, the peripheral portions of the openings and the flow-impervious wall sections are in a relationship with one another such that, on the one hand, an adequate supply of fresh air and, on the other hand, a forced supply of the flow are assured to an adequate extent, including in the peripheral direction around the filter element.

The angle of inclination of the filter axis from the vertical direction can advantageously be >30° and in particular >45°. The aforementioned angle of inclination is expediently ≤100° and in particular ≤90°. As a result, an upper filter section is distinctive to such an extent that the inventive flow guide with its effect on the avoidance of deposits described above makes its full impact felt.

It may be expedient to dispose the upper, permanently open cold air intake window adjacent to a front side of the air filter, that is, adjacent to the filter base or to the front wall of the filter cover. However, the upper, permanently open cold air intake window is preferably formed in the peripheral wall of the filter housing and is oriented towards the upper side of the filter periphery. The cold air inlet window is configured particularly expediently in the peripheral wall of the filter housing and adjacent to or adjoining the filter base. As a result, the critical upper filter section, in particular the preferred corner between the filter element and the filter base for the collection of dirt, is supplied directly with intake air at a correspondingly high flow velocity.

Expediently, the upper, permanently open cold air intake window is disposed on the periphery of the filter element. As an alternative or in combination therewith, it may also be advantageous for at least one air intake window to be disposed on the periphery of the filter element. This encourages a proportionate radial flow through the filter element along its periphery and, in addition, a cleaning surround-flow in the peripheral direction.

In a further embodiment, the air filter unit has, as an autonomous inventive concept, a base component, which constitutes a filter base of the filter housing and, in addition, extends beyond the contour of the filter housing, at least in sections, in such a way that it constitutes a wall part of a fresh air channel leading into the filter housing. Particularly flow-impervious guiding of the intake air is possible as a result, whereby reliable screening against performance-reducing hot air originating from the combustion engine is successful.

The combustion engine preferably has a cooling air duct having a separation from the air intake duct for the air filter unit. The combustion engine is expediently an injection engine without preheating of the intake air. The fresh intake air that is used is thus exclusively cold air, which is not only temporarily available, and which, in addition to keeping the filter clean permanently, also contributes to a high power delivery of the combustion engine on account of the high airtightness.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
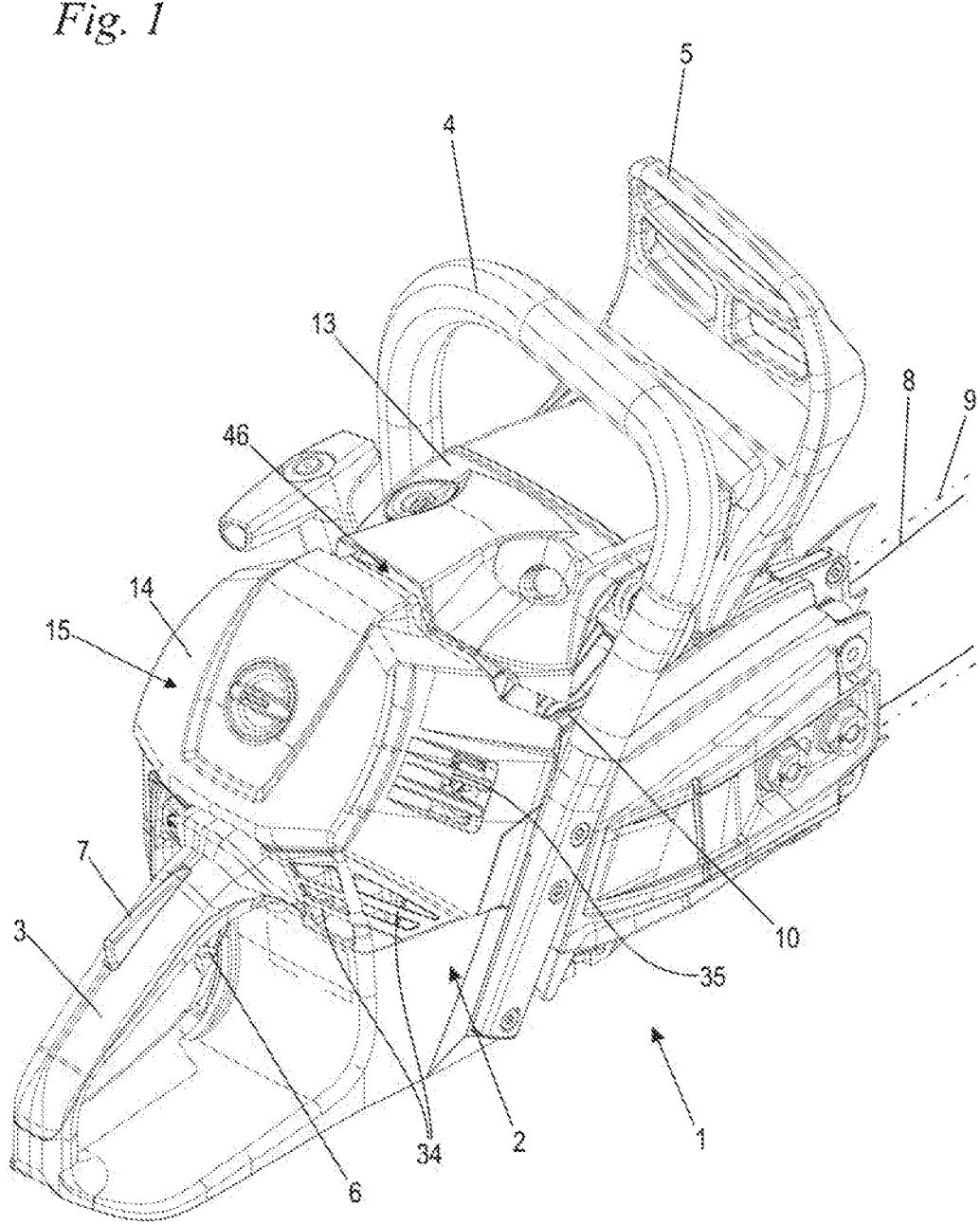
FIG. 1 depicts an inventive work apparatus in a perspective view using the example of a chain saw.

FIG. 1 shows a handheld work apparatus 1 in a perspective view. The work apparatus 1 in the embodiment is a portable, handheld power saw. The handheld work apparatus 1 can also be another work apparatus, however, for example a brush cutter, an angle grinder, a blower or the like. The work apparatus 1 has a housing 2, in which a combustion engine 10 is disposed. The combustion engine 10, which is only partially visible between the housing parts of the housing 2 in FIG. 1, serves for driving a tool of the work apparatus 1. The tool in the embodiment is a schematically represented saw chain 9, which runs around a guide bar 8.

A rear handle 3 and a bale handle 4 are provided for guiding the work apparatus 1. A hand protector 5, which is fixed to the housing 2, is disposed on the side of the bale handle 4 facing towards the saw chain 9. The hand protector 5 in a preferred configuration serves for the operation of a brake device for the saw chain 9. A throttle lever 6 and a throttle lever lock 7 are pivotably mounted on the rear handle 3. The throttle lever 6 is used to control the combustion engine 10. The housing 2 includes a cover 13, which constitutes a part of the external casing of the work apparatus 1. The cover 13 covers the combustion engine 10 of the work apparatus 1 at least partially. In the embodiment, the cover 13 constitutes a part of the housing 2. The housing 2 in this case includes a number of components, which may also possess other functions. In particular, the housing 2 is not a closed housing. The housing 2 in addition includes a removable air filter cover 14 configured separately from the cover 13 in the embodiment, wherein a gap 46 is present between the cover 13 and the air filter cover 14. The releasably fixed air filter cover 14 is part of an inventive air filter unit 15, which is described in more detail below. Intake gratings 34, 35, through which fresh air is drawn in from the surrounding environment in the course of operation and is supplied through the air filter unit 15 to the combustion engine 10 as combustion air, are configured in the fixed part of the housing 2 underneath the air filter cover 14 and also in the air filter cover 14 itself.

Figure 2:
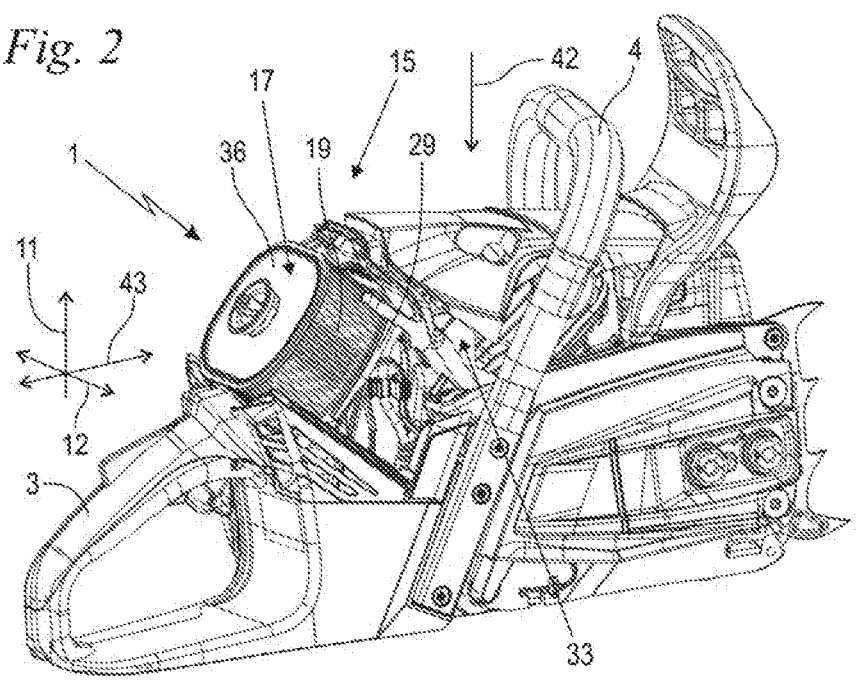
FIG. 2 depicts the work apparatus according to FIG. 1 with the air filter cover removed and with details of the embodiment of the intake air filter.

FIG. 2 depicts the work apparatus 1 according to FIG. 1 in its set-down position in a perspective view, that is, when it has been set down on a surface perpendicular to the direction of gravity 42, that is, a horizontally oriented surface. This set-down position also corresponds in addition to a normal working position, in which the work apparatus 1 is held and guided at the rear handle 3 and at the bale handle 4, and in which the underside of the work apparatus 1 faces towards the floor. The work apparatus 1 defines a vertical direction 11, which is oriented parallel to the direction of gravity 42 in the depicted set-down position. In addition, the work apparatus 1 extends from the rear handle 3 to the opposing front end of the guide bar 8 (FIG. 1) in a longitudinal direction 43, which is oriented perpendicularly to the vertical direction 11. A horizontal direction 12 is also oriented perpendicularly to the vertical direction 11 and also perpendicularly to the longitudinal direction 43 of the work apparatus 1.

Unlike the representation in FIG. 1, the work apparatus 1 in FIG. 2 is depicted with the air filter cover 14 removed. It can thus be seen that, in addition to the aforementioned air filter cover 14, which is not represented here, the air filter unit 15 also has a base component 29, onto which an air filter 17 having an impermeable front wall 36 and having an air-permeable, peripheral filter element 19 is placed or pushed. This configuration means that the flow through the filter element 19 in operation is radial to a filter axis 18 represented in FIG. 3. In the context of the disclosure, the filter element 19 need not be a filter element with a through-flow that is exclusively radial to the filter axis 18. It may also be expedient, in point of fact, for example without recourse to an impermeable front wall 36, also to permit an axial through-flow of the filter element 19 in addition to the radial through-flow.

Figure 3:
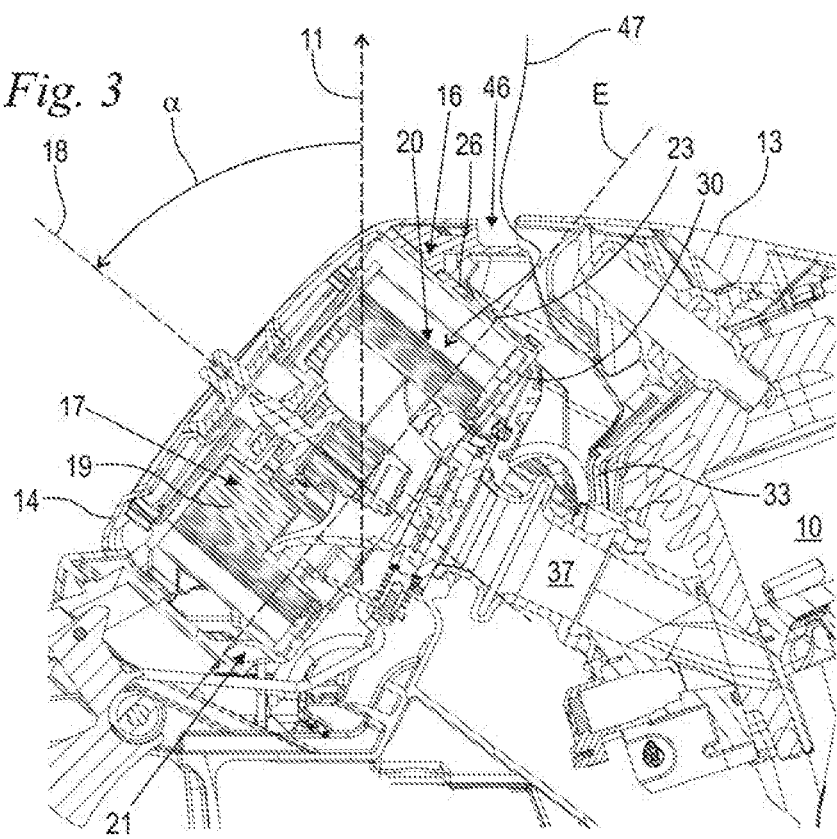
FIG. 3 depicts the work apparatus according to FIG. 1 in a longitudinal sectional representation in the region of an air filter with details of the geometrical embodiment of the air filter unit.

FIG. 3 depicts the work apparatus 1 according to FIGS. 1 and 2 with the air filter cover 14 in place and with further details of the air filter unit 15 represented in FIG. 2. In addition, a part of the combustion engine 10 can be seen, which, by means of an intake channel 37, draws fresh combustion air, and accordingly in the filtered state, through the air filter unit 15. Furthermore, a cooling air duct is present around the cylinder of the combustion engine 10, which is separated by means of a separation 33 from the intake air duct of the air filter unit 15 described in greater detail below. In the depicted embodiment, the combustion engine 10 is an injection engine without preheating of the intake air. All of this means that the combustion air drawn through the air filter unit 15 is cold air from the surrounding environment without any technically relevant influence of heat from the combustion engine 10, which is hot in operation. In the context of the disclosure, the combustion engine 10 can also be embodied as a carburetor engine with and without carburetor preheating that can be switched on as the need arises.

It can be appreciated from the overview in FIGS. 2 and 3 that the air filter 17 extends along a filter axis 18, wherein the filter element 19 runs all around the filter axis 18. The clean air side of the air filter 17 situated inside the filter element 19 is covered by the front wall 36 represented in FIG. 2 on the side facing away from the combustion engine 10, and by a filter base 30 on the front side facing towards the combustion engine 10. The filter element 19 can advantageously be supported in particular in a dimensionally stable manner at both axial ends, so that a peripheral seal is formed between the filter base 30 and the support of the filter element. The filter base 30 is part of the base component 29 represented in FIGS. 2 and 5. The filter element 19 is air-permeable relative to the filter axis 18 and is made of a filter material arranged in a fold-shaped manner for this purpose. However, embodiments without folds and embodiments with several filter layers may be expedient. The filter material contains in particular polymer components and is configured as filter fleece (filter paper) or filter mat. Other filter materials can also be used, however. Nevertheless, in the context of the disclosure, the objective is for the peripheral filter element 19 to be exposed to fresh inlet air, distributed over its entire periphery, and then for the through-flow to be radial to the filter axis 18. A filter housing 16, which surrounds the air filter 17, is provided for this purpose in addition to the front wall 36 already mentioned above. The filter housing 16 is constituted inter alia by the filter base 30 already mentioned above and also by a peripheral wall 26 formed in the air filter cover 14 and partially running around the filter element 19.

It can also be appreciated in FIG. 3 that the filter axis 18 forms an angle of inclination α in relation to the vertical direction 11. Measured or deducted therefrom, based on the vertical direction 11, the angle of inclination α of the filter axis 18 is preferably >30° and in particular >45°, and amounts to about 50° in the depicted embodiment. However, the angle of inclination α is advantageously not greater than 100° and in particular ≤90°. As a consequence of the aforementioned inclination of the filter axis 18, the filter element 19 forms an upper filter section 20 in relation to the vertical direction 11.

The filter housing 16 is provided, remotely from the aforementioned upper filter section 20, with at least one air intake window 21 that is described in more detail below, wherein it will be appreciated from the other representations that two suchlike air intake windows 21, 22 are in fact present to one side of the upper filter section 20 in the depicted embodiment. In addition thereto, the filter housing 16 is further provided with an upper, permanently open cold air intake window 23, which is positioned in the radial direction immediately opposite the outside of the upper filter section 20, although in each case in the effective area of the upper filter section 20. In operation, a cold air flow 47 is drawn in as a proportional combustion air flow through the gap 46 between the cover 13 and the air filter cover 14, and from there through the cold air intake window 23 into the interior of the filter housing 16. The permanently open cold air intake window 23 may advantageously be not only situated close to the upper filter section 20, but is also close to the filter base 30 in the direction of the filter axis 18. In the longitudinal sectional representation according to FIG. 3, the filter base 30 and the upper filter section actually form a low-lying corner, which for its part represents a deepest point or a deepest edge of the outer upper side of the filter. This region is particularly susceptible to the collection of dirt, since dirt slides to this point automatically because of operation-related vibrations and accumulates there. Nevertheless, positioning of the upper, permanently open cold air intake window 23 at this point ensures that the aforementioned corner region is blown out in particular by means of the cold air flow 47 and, as a result, is reliably kept clear.

In addition, the upper, permanently open cold air intake window 23 and at least one of the two air intake windows 21, 22, in this case both of the air intake windows 21, 22, are disposed on the periphery of the filter element 19. In the depicted side view in FIG. 3, the peripheral side of the filter element 19 lies on an imaginary connecting line from the upper, permanently open cold air intake window 23 to the air intake window 21 that can be seen here. This favors in particular the combination, described in greater detail below, of the radial flow through the filter element 19 with, at least partially, a through-flow on the external side or the peripheral side in the peripheral direction, including the formation of a congestion region, which prevents the formation of deposits in particular in the upper filter section 20.

Figure 4:
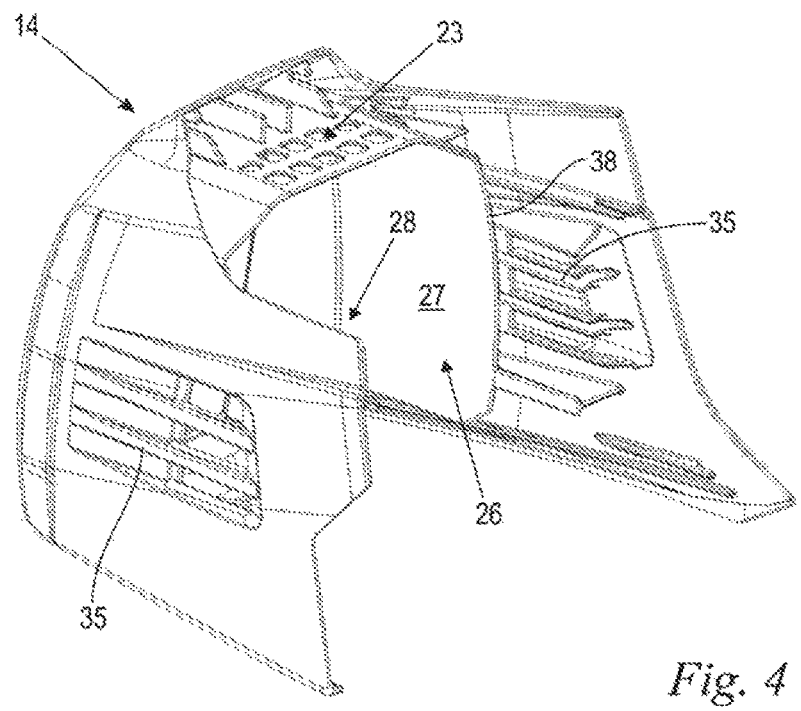
FIG. 4 depicts the air filter cover according to FIGS. 1 and 3 in a perspective view with details of the embodiment of an upper, permanently open cold air intake window in an inner peripheral wall.

FIG. 4 depicts the air filter cover 14 according to FIGS. 1 and 3 in a perspective view. It can be appreciated here that the peripheral wall 26 of the filter housing 16 (FIG. 3), as already mentioned above, is integrally formed on the inside of the air filter cover 14. The permanently open cold air intake window 23 is configured in the upper section of the peripheral wall 26, which is oriented more or less horizontally in this view. The opening in this case can be a single opening. In the depicted embodiment, the permanently open cold air intake window 23 is subdivided into a number of partial openings by a grating structure. Adjoining these on both sides are lateral, flow-impervious wall sections 27, 28. The air filter cover 14 is provided in addition on both lateral surfaces with the intake gratings 35 already mentioned above in conjunction with FIG. 1 remotely from the peripheral wall 26, in particular in the longitudinal direction of the work apparatus 1 in front of the peripheral wall 26.

Figure 5:
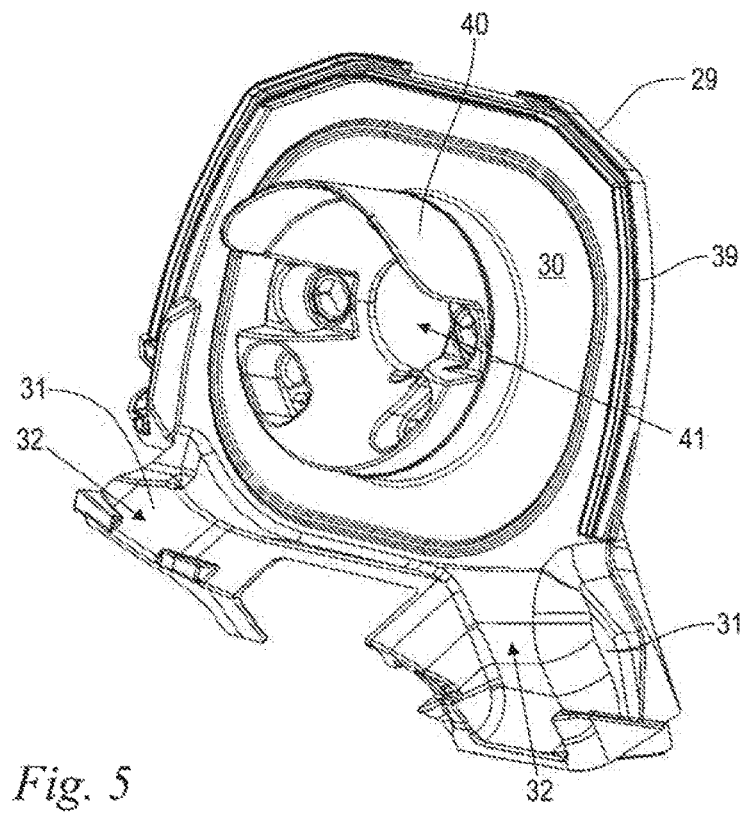
FIG. 5 depicts the base component of the air filter unit according to FIGS. 1 to 4 in a perspective view with details of formed wall parts to produce fresh air channels; and, FIG. 6 depicts the work apparatus according to the preceding figures in a cross section through its air filter unit with details of the positioning and the extent of the various air windows.

FIG. 5 depicts the aforementioned base component 29 already mentioned above in conjunction with FIGS. 2 and 3 in a perspective view. A central part of the base component 29 constitutes the filter base 30 of the filter housing 16 according to FIG. 3. The filter base 30 is provided with a central collar 40 for this purpose, onto which the air filter 17 is pushed (FIGS. 2, 3). An outlet 41 situated inside the collar 40 discharges into the intake channel 37 (FIG. 3), so that intake air filtered in this way is fed from the inner clean side of the air filter 17 to the combustion engine 10.

In addition, it is apparent from the representation according to FIG. 5 that the filter base 30 is provided with an elastic sealing groove 39 in the region of its outer edge. This corresponds in terms of its course and extent to a front edge 38 of the peripheral wall 26 represented in FIG. 4. In the assembled state, as is particularly apparent in FIG. 3, the peripheral wall 26 engages in a sealing manner with its front edge 38 (FIG. 4) in the sealing groove 39. With the exception of the air intake windows 21, 22 and the upper, permanently open cold air intake window 23 (FIGS. 3, 4, 6), the air filter 17 is thus tightly surrounded externally, whereas it is connected on its inner clean side to the combustion engine 10 (FIG. 3) exclusively via the outlet 41.

According to an autonomous inventive concept, which only finds an application here preferably in conjunction with the likewise inventive upper, permanently open cold air inlet window 23, but which also represents an autonomous invention and can be used without the latter, the base component 29 constitutes not only the filter base 30 of the filter housing 16, but is also, at least in sections, withdrawn in the radial direction over the contour of the filter housing 16 (FIG. 3) in such a way that it constitutes at least one wall part 31 of a fresh air channel 32 leading into the filter housing 16. It emerges from a comparison with FIG. 6 that a total of two suchlike wall parts 31 intended to form two fresh air channels 32 are integrally formed on the base component 29 and are led as far as the external contour of the work apparatus 1, wherein each fresh air channel 32 leads respectively to one of the two air intake windows 21, 22.

Figure 6:
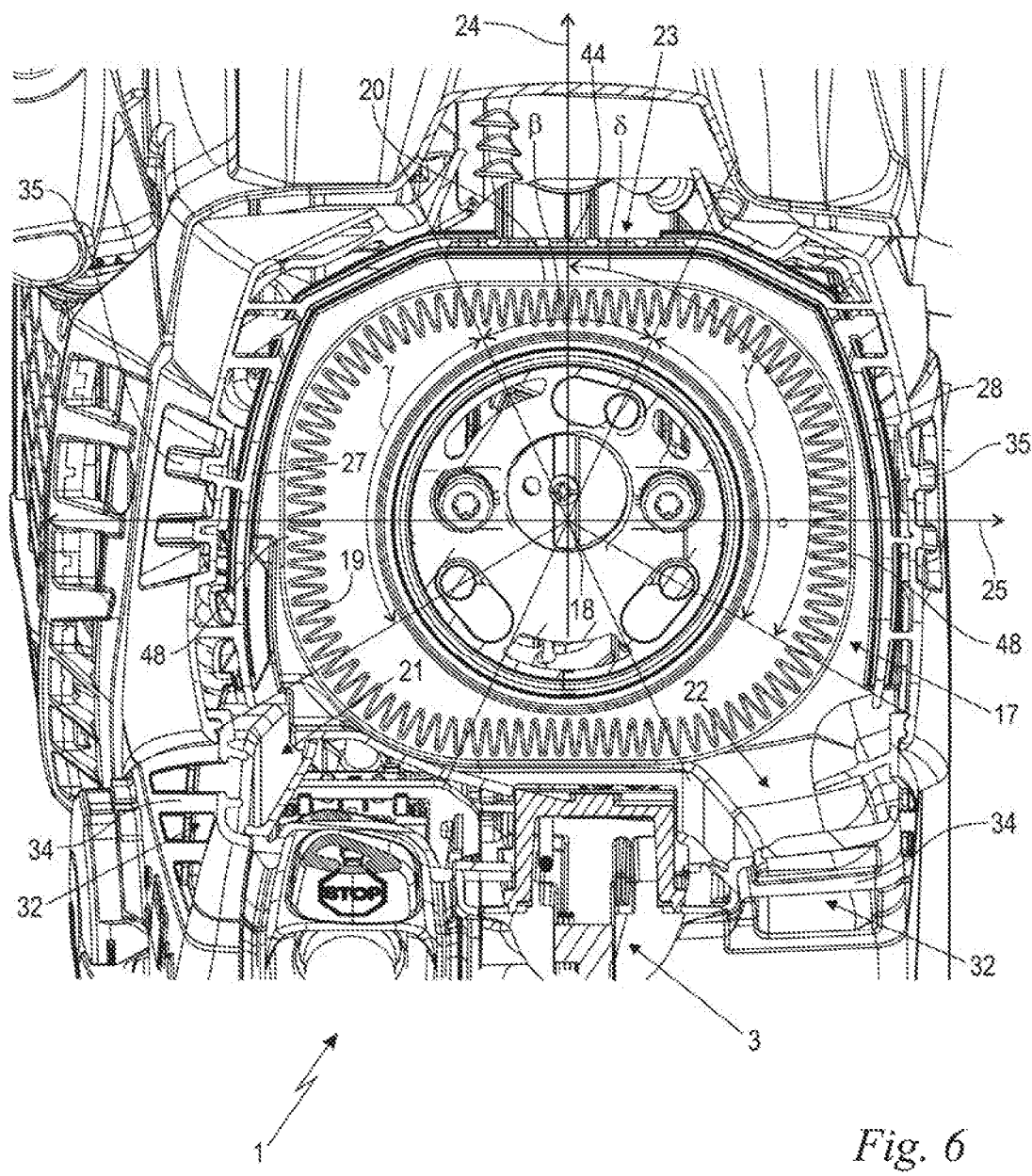

FIG. 6 depicts the work apparatus 1 according to FIGS. 1 to 5 in a cross section through the region of the air filter 17. Reference is made initially, however, to the longitudinal sectional representation according to FIG. 3, according to which the air filter unit 15 defines a reference plane E, which is oriented perpendicularly to the filter axis 18. The cross section according to FIG. 6 is selected so that a top view more or less perpendicular to the aforementioned reference plane E is represented. It emerges from a comparison of FIGS. 2, 3 and 6 that the vertical direction 11 and the horizontal direction 12 can be projected onto the reference plane E in the horizontal direction, that is, in the longitudinal direction of the work apparatus 1. As a result of this, an upwardly directed axis 24 and a transverse axis 25 oriented perpendicularly thereto are defined on the reference plane E according to the representation in FIG. 6. The upwardly directed axis 24 and the transverse axis 25 are oriented not only perpendicularly to one another, but also perpendicularly to the filter axis 18. In the direction of viewing perpendicular to the reference plane E, the upper, permanently open cold air intake window 23 lies on the upwardly directed axis 24, and thus includes the latter. In this case, the center of the cold air intake window 23 can be displaced laterally to the upwardly directed axis 24 in the direction of the transverse axis 25, in particular when the lateral air intake windows 21, 22 are of asymmetrical configuration. In the depicted, preferred embodiment, the upper, permanently open cold air intake window 23 is configured with axial symmetry in relation to the upwardly directed axis 24. Accordingly, its center is thus situated on the upwardly directed axis 24 in the direction of the transverse axis 25. The upper, permanently open cold air inlet window 23 extends in the reference plane E around the filter axis 18 through a first peripheral angle β, wherein the first peripheral angle β is ≤90° and in particular ≤70° and, in the depicted embodiment, about 50°. A further geometrical characterizing feature concerns the positioning of the windows. The upper, permanently open cold air intake window 23 has a center point 44 in the top view of the reference plane E and in relation to its extent in the peripheral direction around the filter axis 18. The center point 44 of the upper, permanently open cold air intake window 23 is positioned, lying in the reference plane E or in the plan view of the reference plane E, at a third peripheral angle δ relative to the adjoining edge of the neighboring air intake window 22, wherein the third peripheral angle δ falls within a range from 100° to 130° inclusive and in the depicted preferred embodiment amounts to at least approximately 120°. The same also applies in principle to the center point 44 of the upper, permanently open cold air intake window 23 and the adjoining edge of the additional lateral air intake window 21.

It also emerges from a comparison of FIGS. 4, 5 and 6 that a lateral, flow-impervious wall section 27, 28 of the peripheral wall 26 (FIG. 4) is present respectively to either side of the cold air intake window 23. Both flow-impervious wall sections 27, 28 start from the upper cold air intake window 23 and extend through a second peripheral angle (γ), in each case in the peripheral direction, as far as the respective adjoining air intake window 21, 22. The second peripheral angle (γ) may advantageously be >80° and in particular >90°, and is about 95° in the depicted embodiment. It can be appreciated in any case that an air intake window 21, 22 is positioned here to either side of the upwardly directed axis 24 and, in particular, also to either side of the rear handle 3, and that these are therefore lateral air intake windows 21, 22. However, a single lateral or even a central air intake window 21, 22 can be provided. It can also be appreciated that both air intake windows 21, 22 are situated beneath the transverse axis 25 in relation to the upwardly directed axis 24, that is, they are positioned opposite the permanently open cold air intake window 23 in the direction of the upwardly directed axis 24.

Finally, it can also be appreciated from FIG. 6 that the work apparatus 1 has respective rear lower intake gratings 34 to either side and also higher intake gratings 35 to either side, in the direction of the transverse axis 25 or in the horizontal direction 12 (FIG. 2). The lower air intake windows 21, 22 are provided through these intake gratings 34, 35 with fresh and cold combustion air from the surrounding environment by the respective fresh air channel 32. The upper, permanently open cold air intake window 23 obtains its fresh, cold intake air proportionally from the surrounding environment through the upper intake grating 35 and the upper gap 46 between the air filter cover 14 and the cover 13, which can be seen in particular in FIGS. 1 and 3. In any case, an external surround-flow in the peripheral direction, which prevents the formation of deposits in particular on the upper filter section 20, can also be appreciated at least partially in the top view according to FIG. 6 in addition to the otherwise intended radial through-flow of the filter element 19. The comparatively clean cold air flow entering through the upper, permanently open cold air intake window 23 is diverted laterally and, in the depicted top view, is guided on the reference plane E downwards to lateral regions 48 of the filter element 19. The relatively heavily contaminated partial air flow entering via the air intake windows 21, 22 is also diverted laterally and, in the depicted top view of the reference plane E, is guided upwards to the lateral regions 48. The partial air flows coming from above and below meet in the lateral regions 48 of the filter element 19 and accumulate together in the peripheral direction. The location of the accumulation region can be positioned accurately in the lateral regions 48 of the filter element 19 by the appropriate coordination in particular of the aforementioned parameters concerning the position and the extent of the upper, permanently open cold air intake window 23 and also of the air intake windows 21, 22. Shavings or other contamination entering from below are unable to make their way upwards through this accumulation region to the upper filter section 20, but are retained there. At the latest during idling or with the combustion engine 10 switched off (FIG. 1), any deposited particles will drop downwards from the lateral regions 48 of the filter element 19 in the direction of the upwardly directed axis 24, so that the filter element 19 remains permanently permeable.

In summary, the applicant's invention is directed to a handheld work apparatus having a set down position when placed on a horizontal surface perpendicular to gravity (42). The work apparatus defines a longitudinal axis (43) parallel to the horizontal surface when in the set down position.

An exemplary embodiment of the work apparatus according to the invention includes: a tool; a combustion engine (10) for driving the tool; an air filter unit (15) for filtering intake air of the combustion engine (10); the air filter unit (15) including an air filter (17) and a filter housing (16) enclosing the air filter; the air filter (17) extending along a filter axis (18) and having a filter element (19) disposed peripherally around the filter axis (18); the filter axis (18) being at an angle of inclination (a) with respect to an imaginary vertical line (11) drawn perpendicularly to the longitudinal axis (43) with the work apparatus in the set down position; the filter element (19) having an upper filter section (20) in relation to the imaginary vertical line (11); the filter housing (16) having, remotely from the upper filter section (20), at least one air intake window (21, 22); and, the filter housing (16) having, in addition to the at least one air intake window (21, 22), a further upper, permanently open cold air intake window (23) in a region of the upper filter section (20).

It is understood that the foregoing description is that of the preferred embodiments of the invention and that various changes and modifications may be made thereto without departing from the spirit and scope of the invention as defined in the appended claims.

What is claimed is:

1. A handheld work apparatus having a set down position when placed on a horizontal surface perpendicular to gravity, the work apparatus defining a longitudinal axis parallel to said horizontal surface when in said set down position and said handheld work apparatus comprising:
    a tool;
    a combustion engine for driving said tool;
    an air filter unit for filtering intake air of said combustion engine;
    said air filter unit including an air filter and a filter housing enclosing said air filter;
    said air filter extending along a filter axis and having a filter element disposed peripherally around said filter axis;
    said filter axis being at an angle of inclination (α) with respect to an imaginary vertical line drawn perpendicularly to said longitudinal axis with said work apparatus in said set down position;
    said filter element having an upper filter section in relation to said imaginary vertical line;
    said filter housing having, remotely from said upper filter section, at least one air intake window; and,
    said filter housing having, in addition to said at least one air intake window, a further upper, permanently open cold air intake window in a region of said upper filter section.

2. The handheld work apparatus of claim 1, wherein a flow through said filter element is radial to said filter axis.

3. The handheld work apparatus of claim 1, wherein:
said air filter unit defines a reference plane (E) perpendicular to said filter axis and an upwardly directed axis lying in said reference plane (E) perpendicular to said filter axis; and,
said upper, permanently open cold air intake window is disposed on the upwardly directed axis.

4. The work apparatus of claim 3, wherein said upper, permanently open cold air intake window is configured symmetrically to the upwardly directed axis.

5. The work apparatus of claim 1, wherein:
said air filter unit defines a reference plane (E) perpendicular to said filter axis and an upwardly directed axis lying in said reference plane (E) perpendicular to said filter axis;
and,
said filter housing has a lateral air intake window on mutually opposite sides of said upwardly directed axis.

6. The work apparatus of claim 1, wherein:
said air filter unit defines a reference plane (E) perpendicular to said filter axis and an upwardly directed axis lying in said reference plane (E) perpendicular to said filter axis and a transverse axis lying perpendicular to said upwardly directed axis;
said at least one air intake window is disposed beneath the transverse axis.

7. The work apparatus of claim 1, wherein:
said air filter unit defines a reference plane (E) perpendicular to said filter axis;
said upper, permanently open cold air intake window extends in said reference plane (E) over a first peripheral angle ($\beta$); and,
said first peripheral angle ($\beta$) is $\leq 90°$.

8. The work apparatus of claim 1, wherein:
said air filter unit defines a reference plane (E) perpendicular to said filter axis;
said upper, permanently open cold air intake window extends in said reference plane (E) over a first peripheral angle ($\beta$); and,
said first peripheral angle ($\beta$) is $\leq 70°$.

9. The work apparatus of claim 1, wherein:
said air filter unit defines a reference plane (E) perpendicular to said filter axis;
said filter housing has a peripheral wall;
said peripheral wall includes a lateral, flow-impervious wall section between said upper, permanently open cold air intake window and said at least one air intake window;
said lateral, flow-impervious wall section extends in said reference plane (E) over a second peripheral angle ($\gamma$); and,
said second peripheral angle ($\gamma$) is $>60°$.

10. The work apparatus of claim 1, wherein:
said air filter unit defines a reference plane (E) perpendicular to said filter axis;
said filter housing has a peripheral wall;
said peripheral wall includes a lateral, flow-impervious wall section between said upper, permanently open cold air intake window and said at least one air intake window;
said lateral, flow-impervious wall section extends in said reference plane (E) over a second peripheral angle ($\gamma$); and,
said second peripheral angle ($\gamma$) is $>80°$.

11. The work apparatus of claim 1, wherein:
said air filter unit defines a reference plane (E) perpendicular to said filter axis;
said upper, permanently open cold air intake window has a center point in relation to its extent in a peripheral direction;
said center point of said upper, permanently open cold air intake window is positioned in said reference plane (E) at a third peripheral angle ($\delta$) relative to an adjoining edge of said at least one air intake window; and,
said third peripheral angle ($\delta$) lies in a range from 100° to 130° inclusive.

12. The work apparatus of claim 1, wherein:
said air filter unit defines a reference plane (E) perpendicular to said filter axis;
said upper, permanently open cold air intake window has a center point in relation to its extent in a peripheral direction;
said center point of said upper, permanently open cold air intake window is positioned in said reference plane (E) at a third peripheral angle ($\delta$) relative to an adjoining edge of said at least one air intake window; and,
said third peripheral angle ($\delta$) is 120°.

13. The work apparatus of claim 1, wherein said angle of inclination ($\alpha$) of the filter axis is $>30°$.

14. The work apparatus of claim 1, wherein said angle of inclination ($\alpha$) of the filter axis is $>45°$.

15. The work apparatus of claim 1, wherein:
said filter housing has a peripheral wall; and,
said upper, permanently open cold air intake window is formed in said peripheral wall.

16. The work apparatus of claim 1, wherein:
said filter element defines a periphery; and,
said upper, permanently open cold air intake window is disposed on said periphery of the filter element.

17. The work apparatus of claim 1, wherein:
said filter element defines a periphery; and,
said at least one air intake window is disposed at said periphery of said filter element.

18. The work apparatus of claim 1, wherein:
said air filter unit includes a base component which forms a filter base of said filter housing; and,
said base component extends, at least in sections, beyond a contour of said filter housing in such a manner so as to form a wall part of a fresh air channel leading into said filter housing.

19. The work apparatus of claim 1, wherein said combustion engine includes a cooling air duct having a separation with respect to an air intake duct for the air filter unit.

20. The work apparatus of claim 1, wherein said combustion engine is an injection engine without preheating of the intake air.

* * * * *

UNITED STATES PATENT AND TRADEMARK OFFICE
CERTIFICATE OF CORRECTION

PATENT NO. : 10,704,510 B2
APPLICATION NO. : 16/131974
DATED : July 7, 2020
INVENTOR(S) : Wolf et al.

Page 1 of 1

It is certified that error appears in the above-identified patent and that said Letters Patent is hereby corrected as shown below:

In the Specification

<u>In Column 10</u>:
Line 22: delete "(a)" and substitute -- ($\alpha$) -- therefor.

In the Claims

<u>In Column 11</u>:
Line 24: insert -- and, -- after "axis;".

<u>In Column 12</u>:
Line 31: delete "(a)" and substitute -- ($\alpha$) -- therefor.

Signed and Sealed this
Twenty-seventh Day of October, 2020

Andrei Iancu
*Director of the United States Patent and Trademark Office*